(12) United States Patent
Robertson et al.

(10) Patent No.: US 7,490,706 B2
(45) Date of Patent: Feb. 17, 2009

(54) RETRACTABLE ELECTRIC CORD RECEIVING DEVICE AND VENTILATION APPARATUS

(75) Inventors: Terry Robertson, Boulder, CO (US); Fan Jian Wen, Suzhou (CN)

(73) Assignee: Euro-Pro Operating LLC, West Newton, MA (US)

( * ) Notice: Subject to any disclaimer, the term of this patent is extended or adjusted under 35 U.S.C. 154(b) by 160 days.

(21) Appl. No.: 11/070,284

(22) Filed: Mar. 3, 2005

(65) Prior Publication Data

US 2006/0196688 A1    Sep. 7, 2006

(51) Int. Cl.
*H02G 11/00* (2006.01)
(52) U.S. Cl. .............. 191/12.2 R; 191/12.2 A
(58) Field of Classification Search ........... 191/12.2 R, 191/12.4, 12.5
See application file for complete search history.

(56) References Cited

U.S. PATENT DOCUMENTS

| | | | | |
|---|---|---|---|---|
| 2,487,395 | A * | 11/1949 | Strang ................. | 191/12.2 R |
| 4,196,343 | A * | 4/1980 | Han ..................... | 392/385 |
| 4,670,701 | A | 6/1987 | Sako et al. | |
| 4,987,637 | A | 1/1991 | Zummer et al. | |
| 5,412,879 | A * | 5/1995 | Wu ..................... | 34/97 |
| 5,542,183 | A | 8/1996 | Allison | |
| 5,622,243 | A * | 4/1997 | Kang ................... | 191/12.2 R |
| 5,701,981 | A | 12/1997 | Marshall et al. | |
| 5,794,305 | A | 8/1998 | Weger | |
| 6,273,225 | B1 * | 8/2001 | Park ..................... | 191/12.2 R |
| 6,481,050 | B1 * | 11/2002 | Wilson et al. ......... | 15/413 |
| 6,540,168 | B1 | 4/2003 | Archer et al. | |
| 7,152,274 | B2 * | 12/2006 | Alford et al. ......... | 15/352 |
| 2004/0200505 | A1 | 10/2004 | Taylor et al. | |
| 2005/0205711 | A1 * | 9/2005 | Richardson ........... | 242/405.1 |

OTHER PUBLICATIONS

International Search Report for PCT/US06/07591; Sep. 20, 2007 (3 pgs).
Written Opinion for PCT/US06/07591; Sep. 20, 2007 (6 pgs).

* cited by examiner

*Primary Examiner*—Mark T Le
(74) *Attorney, Agent, or Firm*—Venable LLP; Ralph P. Albrecht; Matthew E. Kelley

(57) ABSTRACT

A cord winding mechanism for an electrically powered device such as a vacuum cleaner. The cord winding mechanism may be used with a device having an electric motor. The mechanism may include a cord receiving member for receiving a cord. The cord receiving member may define an interior space and have an axis. The mechanism may include a biasing member that may transmit a rotational force to the cord receiving member to rotate the cord receiving member about the axis. The mechanism may include a retention member that may selectively prevent the cord receiving member from rotating under the rotational force of the biasing member. The cord receiving member may be adapted to receive at least part of the motor inside the interior space of the cord receiving member. The mechanism may include ventilation openings for providing ventilation An electric motor assembly may include the mechanism and a motor. An electric appliance may include a housing and the assembly.

15 Claims, 17 Drawing Sheets

RETRACTABLE ELECTRIC CORD RECEIVING DEVICE AND VENTILATION APPARATUS

BACKGROUND OF THE INVENTION

1. Field of the Invention

The present invention relates generally to retractable power cords. More particularly, the invention relates to retractable power cords for electrically powered devices.

2. Related Art

Conventionally, it is well known to incorporate retractable power cords in electrically powered devices such as vacuum cleaners, and the like. However, in the case of vacuum cleaners, conventionally, retractable power cord mechanisms have been used with canister type vacuum cleaners because of the large amount of space required to include a retractable cord. Handheld vacuums, e.g., thus have not conventionally included retractable power cords because handhelds do not have the space to accommodate the length of cord needed for a vacuum cleaner. Thus, some vacuum cleaners have conventionally included non-retractable power cords, or in the case of rechargeable vacuums have had no power cord in the vacuum unit. Unfortunately however, rechargeable vacuum cleaners often can run out of charge at inopportune times, and may suffer from less power, or require additional weight to accommodate batteries. Thus, it would be desirable to provide a handheld electrically powered device such as a vacuum cleaner that could accommodate a retractable cord of sufficient length to be useful, while avoiding the need for the time to recharge and battery weight of rechargeable models.

BRIEF SUMMARY OF THE INVENTION

An exemplary embodiment of the present invention includes a cord winding mechanism for an electrically powered device such as a vacuum cleaner. An exemplary embodiment of the present invention may include a cord winding mechanism which may be used with an electrically powered component, such as, e.g., but not limited to, an electric motor.

The cord winding mechanism, in an exemplary embodiment, may include a cord receiving member for receiving a cord. In one exemplary embodiment, the cord receiving member may be a physical structure capable of receiving a cord around, or within it to allow retracting of the power cord.

In one exemplary embodiment, the cord receiving member may resemble a spool. In another exemplary embodiment, the cord receiving member may resemble a reel.

In yet another exemplary embodiment, the cord receiving member may include an edge portion and a plurality of cross members. In an exemplary embodiment, there may be two edge portions, and the edge portions may include, e.g., a circular, rectangular, square, polygonal, or other shape. In an exemplary embodiment, the edge portion may have one or more openings. The opening may be used for ventilation, or to receive a portion of the electrically powered component. In an exemplary embodiment, the plurality of cross members may include, e.g., but not limited to, three (3), four (4), or more cross members. One or more of the plurality of cross members may be parallel, or not parallel, in one exemplary embodiment. In another exemplary embodiment, the cord receiving member may include a broad portion and a narrow portion for receiving the cord. In one exemplary embodiment, the cord receiving member may include a conical member. In one exemplary embodiment, the cord receiving member may resemble two co-axial cones coupled point to point.

In one exemplary embodiment, the cord receiving member may define an interior space inside the cord receiving member. In one exemplary embodiment, the cord receiving member may have an axis. In one exemplary embodiment, the cord receiving member may include a surface about which the cord may be wound. In one exemplary embodiment, the surface may be an outside surface. In one exemplary embodiment, the cord receiving member may include an end surface to contain the cord as the cord is retracted. In one exemplary embodiment, the cord may be received within the inside of the cord receiving member. In another exemplary embodiment, the cord may be received outside of the cord receiving member.

In one exemplary embodiment, the cord receiving member may be adapted to be manually wound. In one exemplary embodiment, a crank may be provided to allow manually rewinding the cord about the axis of the cord receiving member. In an exemplary embodiment, the crank may be any of integrated, removable, or collapsible.

In another exemplary embodiment, the cord receiving member may be adapted to be automatically rewound. In one exemplary embodiment, the cord winding mechanism may further include a biasing member that may transmit a rotational force to the cord receiving member to rotate the cord receiving member about the axis.

In an exemplary embodiment, the cord winding mechanism may further include a retention member. In one exemplary embodiment, the retention member may be adapted to selectively prevent the cord receiving member from rotating under the rotational force of the biasing member.

In one exemplary embodiment, the cord receiving member may be adapted to receive at least part of the electrically powered component such as, e.g., but not limited to, a motor, or electrical motor, inside the interior space of the cord receiving member.

In one exemplary embodiment, the cord receiving member may be adapted to receive a substantial portion of the electrical component, or electric motor. In one exemplary embodiment, 50% or more of the electric motor may be received inside the cord receiving member. In another exemplary embodiment, the entire motor may be received within the cord receiving member.

In another exemplary embodiment, the cord winding mechanism may be outside of the area of the electrically powered component, and may be merely electrically coupled to the electrically powered component.

In another exemplary embodiment, the cord winding mechanism may have ventilation openings. The ventilation openings may allow ventilation inside or outside of the cord receiving member. In one exemplary embodiment, the cord receiving member may have ventilation openings. In another exemplary embodiment, the cord receiving member may have an end having ventilation openings for providing ventilation to the electrically powered component, motor, or otherwise. In one exemplary embodiment, the cord receiving member may have ventilation openings on the side opposite the opening of the interior space, or about the interior space, allowing the electrically powered component to vent. For example, heat, or exhause from the electric component may vent or radiate out through the ventilation openings.

In yet another exemplary embodiment, the cord receiving member may have an opening through which the cord may extend and be coupled to the motor. The opening may include a removable slide which when inserted prevents the plug at the end of the cord from moving through the hole in the device housing.

In another exemplary embodiment, an electric motor assembly may include the cord winding mechanism and a motor. In another embodiment, an electric appliance may include a housing and the assembly.

The invention addresses the problem of providing a retractable cord in a compact size appropriate for a handheld electric appliance such as, e.g., but not limited to, a handheld vacuum, a blow dryer, a drill, a grass cutter, etc.

Other embodiments, as well as the structure and function of preferred embodiments will become apparent from a consideration of the description, drawings, and examples.

BRIEF DESCRIPTION OF THE DRAWINGS

The foregoing and other features and advantages of the invention will be apparent from the following, more particular description of preferred embodiments of the invention, as illustrated in the accompanying drawings wherein like reference numbers generally indicate identical, functionally similar, and/or structurally similar elements, and the leftmost digit of a reference number indicates the first figure in which an element appears.

DETAILED DESCRIPTION OF EXEMPLARY EMBODIMENTS OF THE INVENTION

Figure 1:
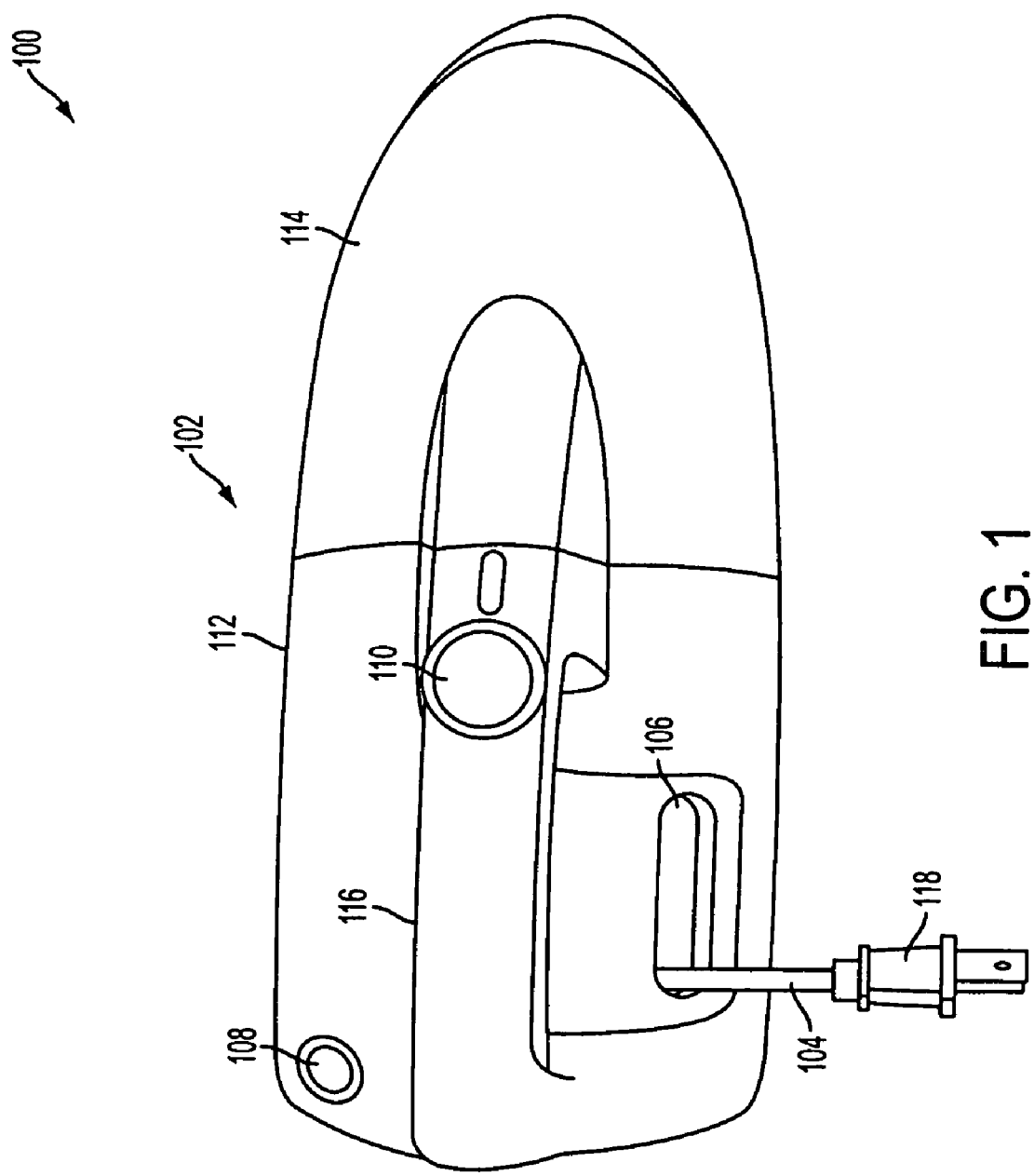
FIG. 1 depicts a top view of an exemplary embodiment of a handheld electric vacuum appliance including an exemplary embodiment of the retractable power cord mechanism according to the present invention.

An exemplary embodiment of the invention is shown in the drawings and described herein. FIG. 1 depicts an exemplary embodiment of the present invention including a top view 100 of the present invention. The top view 100 of the invention illustrates a vacuum 102 having a body that may include a vacuum housing 112 having an opening 106 through which a retractable power cord 104 according to an exemplary embodiment of the present invention may exit the housing. The cord 104 may be prevented from fully retracting into the housing 112 by a plug 1 18 which may be larger than the opening 106 of the vacuum housing. The vacuum housing may include a button 108, which when depressed may retract the cord 104 into the housing 112. In another exemplary embodiment, the cord may be manually retracted by use of a handle, such as, e.g., but not limited to, a crank (not shown). The vacuum 102 may further include a toggle on/off button 110 in an exemplary embodiment. In the exemplary embodiment, the vacuum 102 may include a dust cup 114, in the exemplary embodiment, a bagless, clear dust cup 114. In the exemplary embodiment, the dust cup 114 may be a substantially parabolic cylindrical shape.

The cord winding mechanism according to an exemplary embodiment of the present invention, is best shown in FIGS. 6-14 of the application.

Figure 2:
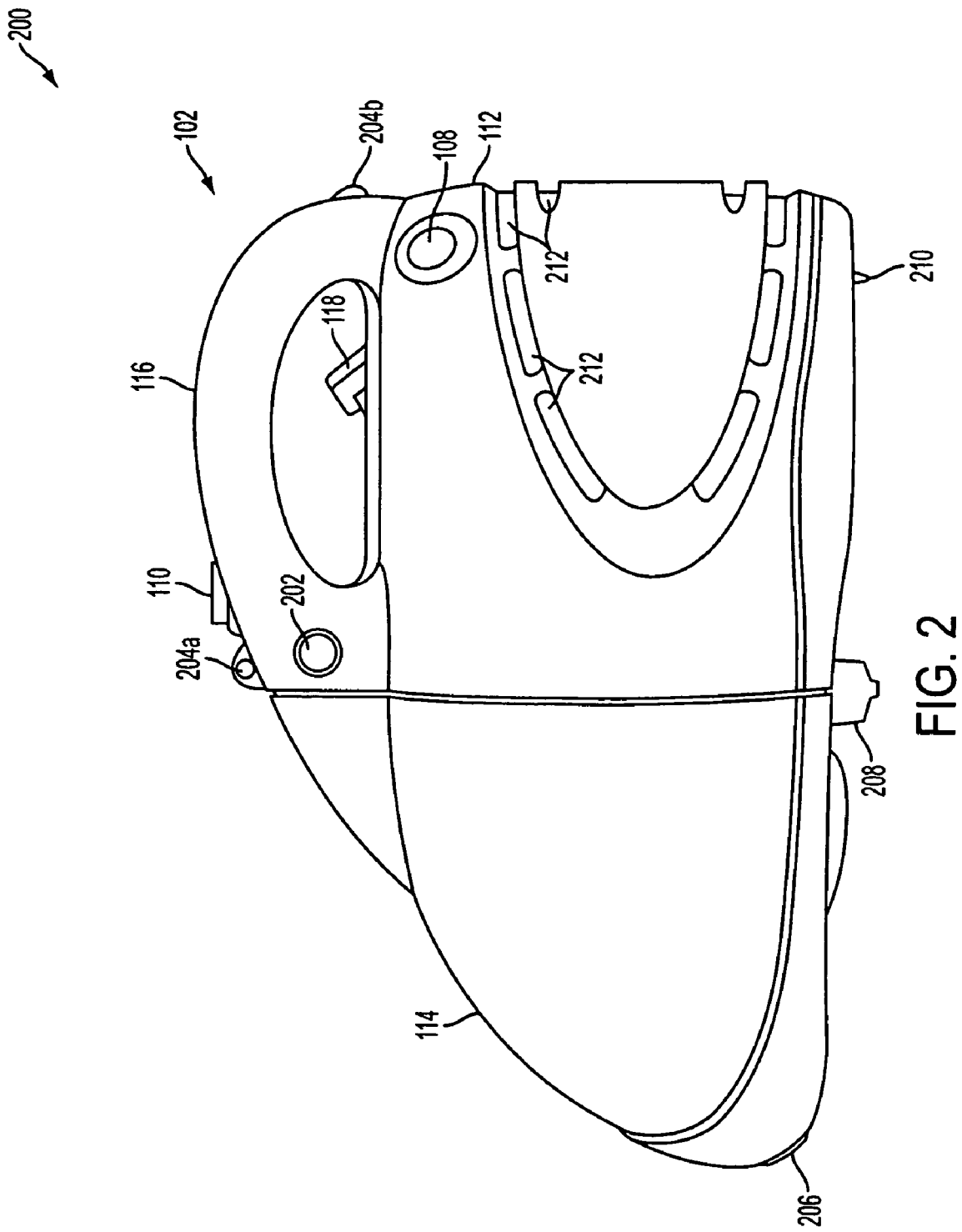
FIG. 2 is a right side view of the exemplary embodiment shown in FIG. 1.

FIG. 2 depicts a right side view 200 of the exemplary embodiment of the vacuum 102 shown in FIG. 1. As shown, the vacuum 102 may further include a button 202, which when depressed may allow the dust cup 114 to be decoupled from the housing 112. A hose (not shown), may be coupled to an opening inlet 206 in the dust cup 114. The inlet 206 is adapted to be coupled to a hose or other conventional attachment. A lip (not shown) of dust cup 114 may lock in a foot 208 of housing 112. The housing 112 may further include on the handle 116, eyelets 204a, 204b, for allowing attachment of a carrying strap or the like (not shown). In an exemplary embodiment, the housing 112 may further include ventilation openings 212 for ventilation and exit of the exhaust from the electric motor of the vacuum 102. The housing 112 may include another foot 210 on which the vacuum may stand along with foot 208 when placed horizontally as shown on a surface or floor.

Figure 3:
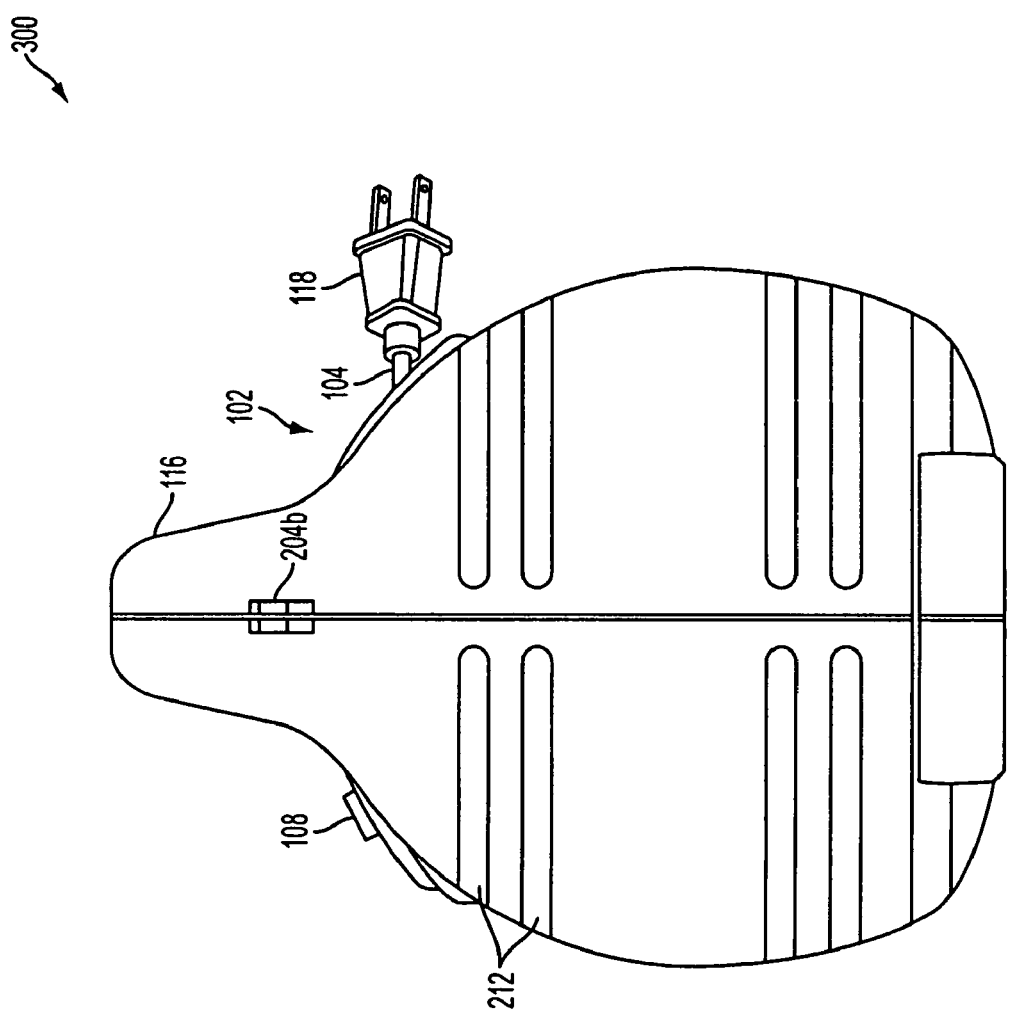
FIG. 3 is a rear view of the exemplary embodiment shown in FIG. 1.

FIG. 3 is a rear view 300 of the exemplary embodiment of vacuum 102 shown in FIG. 1.

Figure 4:
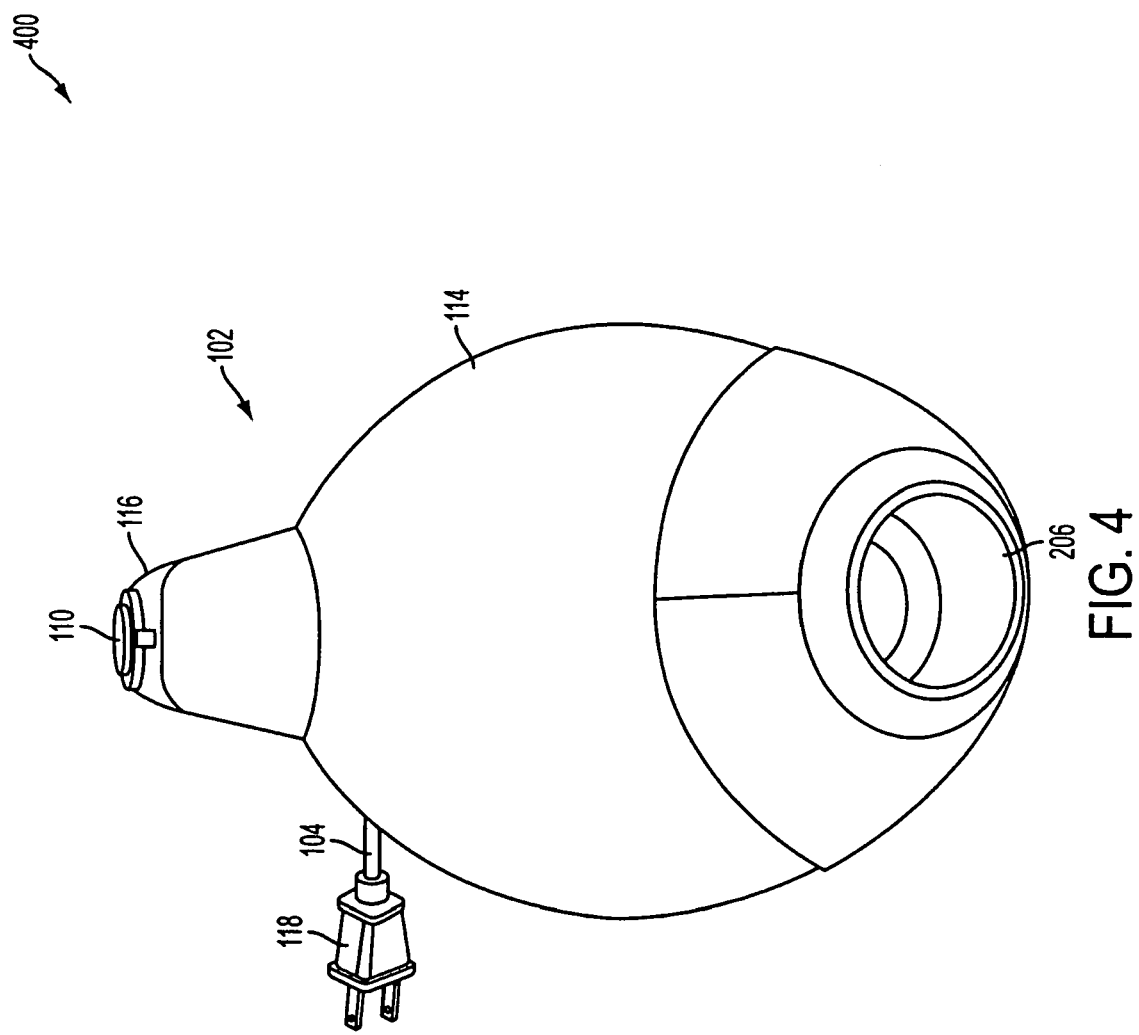
FIG. 4 is a front view of the exemplary embodiment shown in FIG. 1.

FIG. 4 is a front view 400 of the exemplary embodiment shown in FIG. 1.

Figure 5:
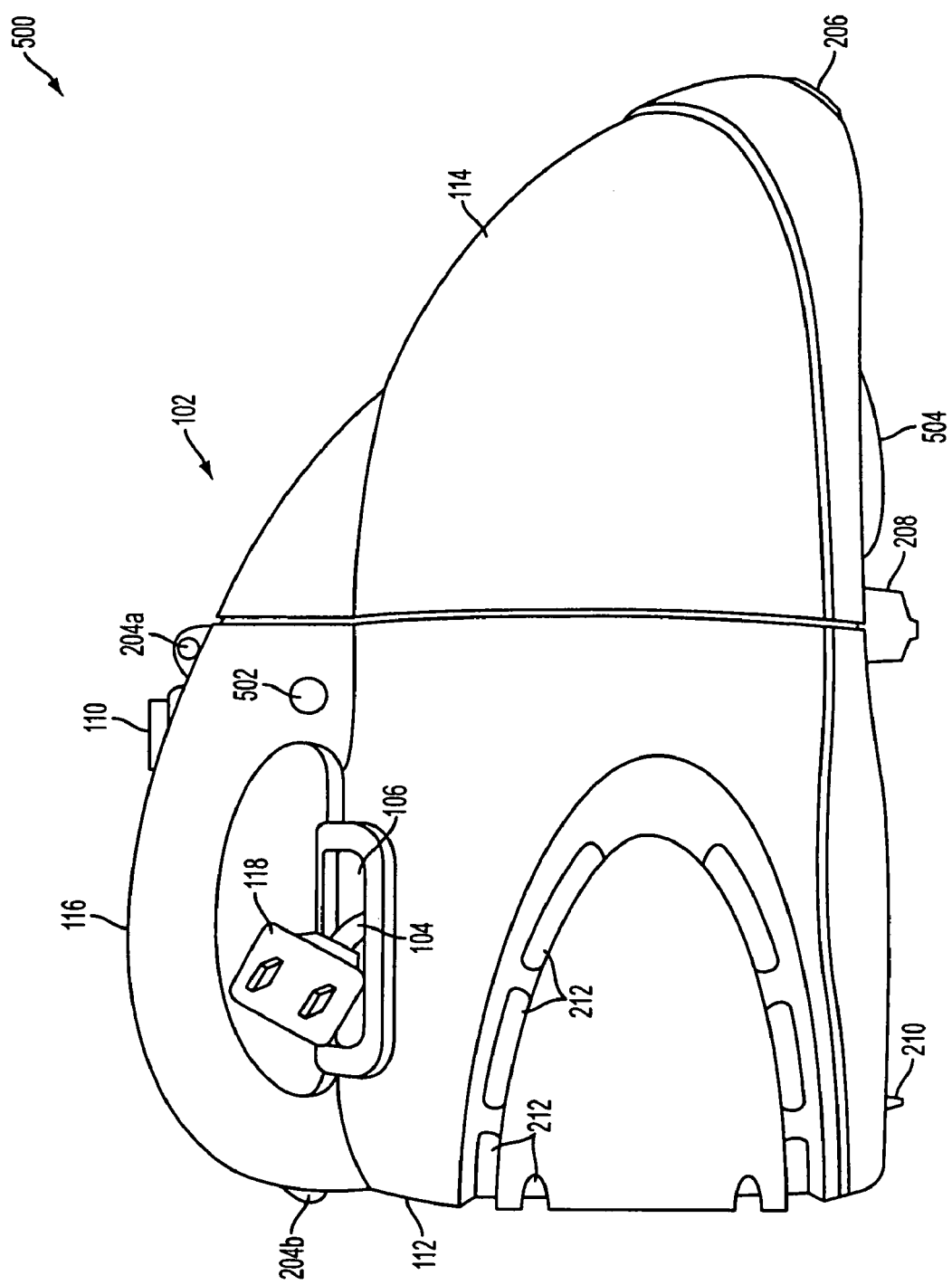
FIG. 5 is a left side view of the exemplary embodiment shown in FIG. 1.

FIG. 5 is a left side view 500 of the exemplary embodiment shown in FIG. 1. Housing 112 may include various holes 502 including screws to secure subportions of housing 112 together. Dust cup 114, in an exemplary embodiment, may further include a portion 504 fluidly coupled to inlet 206 providing a substantially tangential inlet (not shown) into the interior of the substantially parabolically cylindrical dust cup 114. The tangential inlet may include, in an exemplary embodiment, a valve which is normally closed when the vacuum motor is not running and open from the vacuum's suction when the vacuum motor is running.

Figure 6:
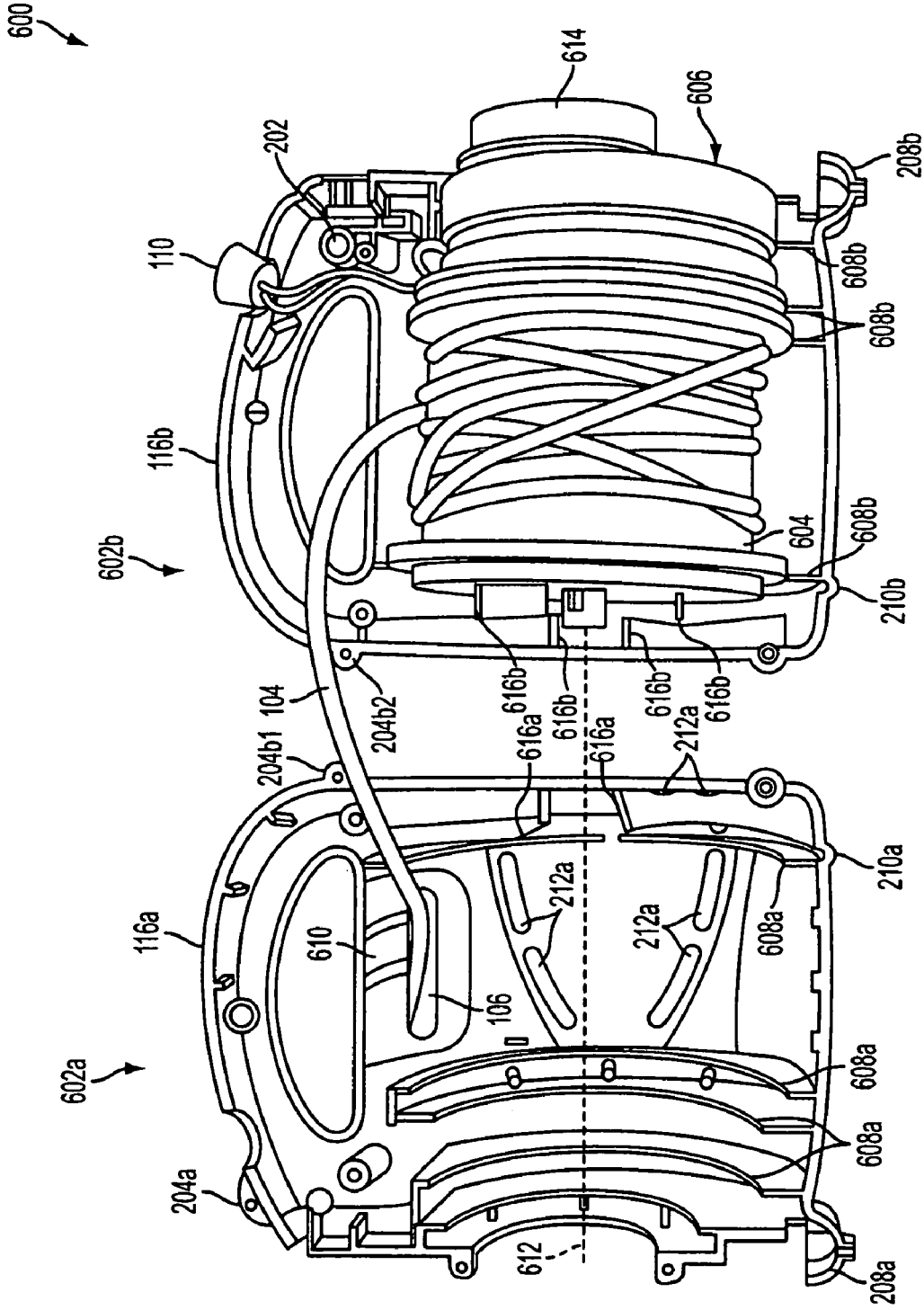
FIG. 6 is a disassembled cross-sectional view of the housing of the exemplary embodiment shown in FIG. 1, illustrating an exemplary cord receiving member cord winding assembly according to an exemplary embodiment of the present invention.

FIG. 6 is a disassembled cross-sectional view 600 of the housing 112 of the exemplary embodiment shown in FIG. 1, illustrating an exemplary cord receiving member 604 cord winding assembly according to an exemplary embodiment of the present invention. As shown, in an exemplary embodiment, housing 112 may include two generally symmetric housing portions 602a and 602b. Housing portion 602a may include, as shown, various holes for accepting screws (not labeled) to secure portion 602a to portion 602b. Housing portion 602a further includes hole 106, and may include a slidingly removable lock slot 610 for allowing cord 104 to be fed into hole 106 during assembly. Housing portion 602a may further include several rails 608a. Rails 608a may, in an exemplary embodiment, be semicircular and may be adapted to receive cord receiving member 604 and to allow cord receiving member 604 to rotate about an axis 612. Housing portion 602b similarly includes rails 608b, in which cord receiving member 604 may rotate as shown about axis 612. In an exemplary embodimente, the cord receiving member 604, as shown may include cord 104 wound about it (or within it in another exemplary embodiment, not shown) and may include an interior space (not shown) into which an electric motor 606 may be inserted as shown. In an exemplary embodiment, an inlet spacer 614 may provide the vacuum interface to the dust cup 114. In an exemplary embodiment, the inlet spacer 614 may include a filter to prevent dust and debris from entering the vacuum motor 606. As shown, one or more anchor guides 616a, 616b, may be included in housing portions 602a, 602b, respectively to be used to anchor a fixed portion of cord receiving member 604 during winding, or unwinding of retractable cord 104.

In one exemplary embodiment, the shape of the cord receiving member 604 may have a shape such as, e.g., but not limited to, a spool, or a reel. In one exemplary embodiment, ventilation holes may be included in the cord receiving member 604.

Figure 7:
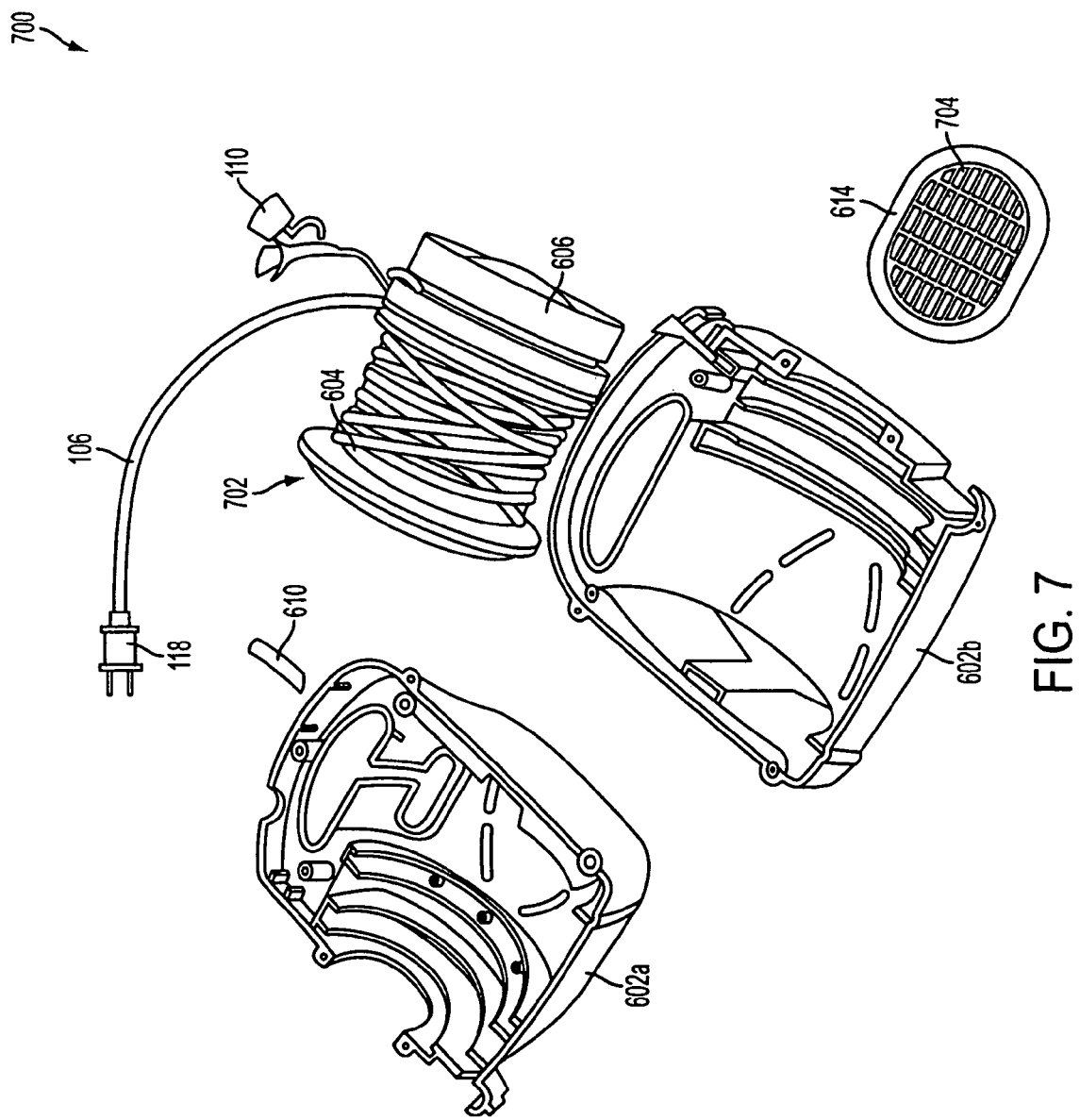
FIG. 7 is a perspective view of the disassembled housing of FIG. 6, with the cord receiving member cord winding assembly and motor removed from the housing according to an exemplary embodiment of the present invention.

FIG. 7 is a perspective view 700 of the disassembled housing of FIG. 6, with the cord receiving member 604 cord winding assembly 702 and motor 606 removed from the housing portions 602a, 602b of housing 112 according to an exemplary embodiment of the present invention. As shown, substantially the entire motor 606 may be contained within the cord receiving member 604. The cord receiving member 604 shape of the cord winding assembly 702 requires very minimal space and provides a very compact, solution. As shown, the inlet spacer 614 may include various holes 704 through which the exhaust may run from the dust cup 114 to the vacuum motor 606.

Figure 8:
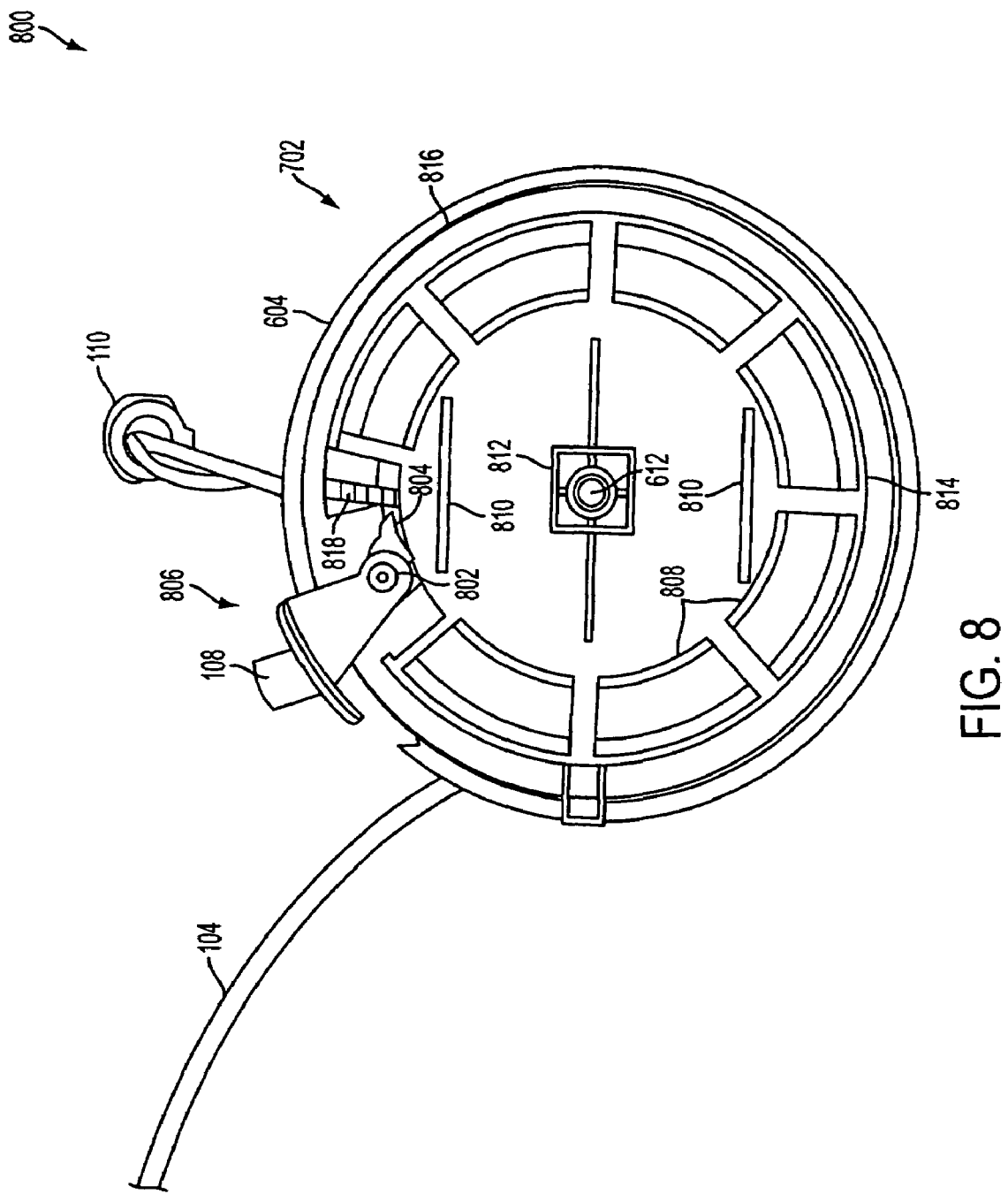
FIG. 8 is a side view of an exemplary embodiment of the cord receiving member cord winding assembly according to an exemplary embodiment of the present invention.

FIG. 8 is a side view 800 of an exemplary embodiment of the cord receiving member 604 cord winding assembly 702 according to an exemplary embodiment of the present invention. The side view 800 of the cord receiving member 604 reveals an outer layer 814 of the cord receiving member 604. Outer layer 604 has locking guides 810, as well as center block 812 (which together interlock with anchor guides 616a, 616b of the housing), which hold outer layer 814 in a fixed position, relative to the remainder of cord receiving member 604, when cord receiving member 604 is inserted into housing portions 602a and 602b, allowing the remainder of the cord receiving member 604 to rotate about axis 612 relative to the foxed position of the outer layer 814. The remainder of the cord receiving member 604 (i.e., other than the outer layer 814), has a lip 816 which rides on rails 608a, 608b, allowing the remainder of the cord receiving member 604 to rotate about axis 612 within the housing 112. A biasing member (not shown), such as, e.g., but not limited to, a spring, may be integrated between cord receiving member 604 and outer layer 814, such that, when the cord receiving member 604 is rotated in a first direction (e.g., clockwise) relative to the outer layer 814 (which may be held in a fixed position by guide 810) such as, when cord 104 is unwound by rotating cord receiving member 604 about axis 612, then the biasing member may become tightly wound creating an opposite rotational force urging the cord receiving member 604 to rotate in a second direction (e.g., counterclockwise) in the opposite direction to rewind the cord 104 about cord receiving member 604. The biasing member, in an exemplary embodiment, may be a spiral spring with an outer portion coupled to outer layer 814, and an inner portion of the biasing member coupled to cord receiving member 604. As the cord receiving member 604 is made to rotate in the first direction about axis 612, a retention member 806 (including, e.g., button member 108, post 802, portion 804, and portion 818, all coupled by post 802 to outer layer 814 of cord receiving member 604), may be made to selectively prevent, or allow, the cord receiving member 604 from rotating under the rotational force of the biasing member. The outer layer 814 of cord receiving member 604, as shown may further include, one or more ventilation openings 808, as shown, to allow for heat within an interior space of cord receiving member 604, to radiate (or be forced out by, e.g., vacuum fan pressure) out of cord receiving member 604. In an exemplary embodiment, the ventilation openings 808, may include one or more segment, or sector shaped openings, arranged about axis 612.

Figure 9:
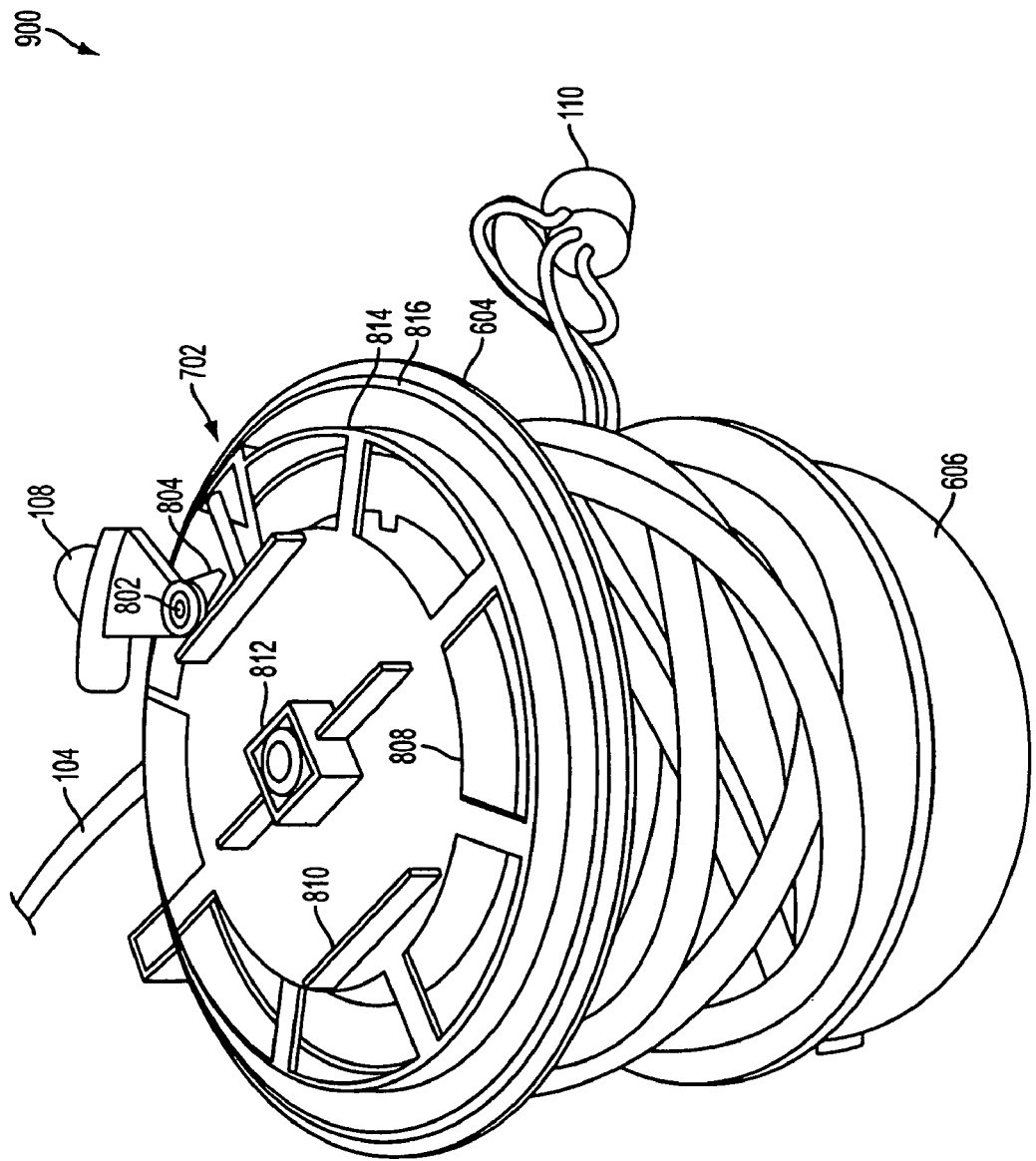
FIG. 9 is a perspective view of the cord receiving member cord winding assembly of FIG. 8 according to an exemplary embodiment of the present invention.

FIG. 9 is a perspective view 900 of the cord receiving member 604 cord 104 winding assembly 702 of FIG. 8 according to an exemplary embodiment of the present invention. As shown, guides 810 and center block 812, may extend outwardly, protruding from outer layer 814, for interlocking with fixed anchor guides 616a, 616b to prevent rotation of the outer layer 814, when the remainder of the cord receiving member 604 is rotated so as to unwind cord 104, about axis 612. As shown, ventilation holes 808 may allow heat to escape from the interior space of cord receiving member 604. As shown view 900 further illustrates the lip 816 which rides on rails 608a, 608b, when cord receiving member 604 is rotated in housing 112 about axis 612. View 900 also reveals an outer portion of electric motor 606 protruding from the interior space of cord receiving member 604.

Figure 10:
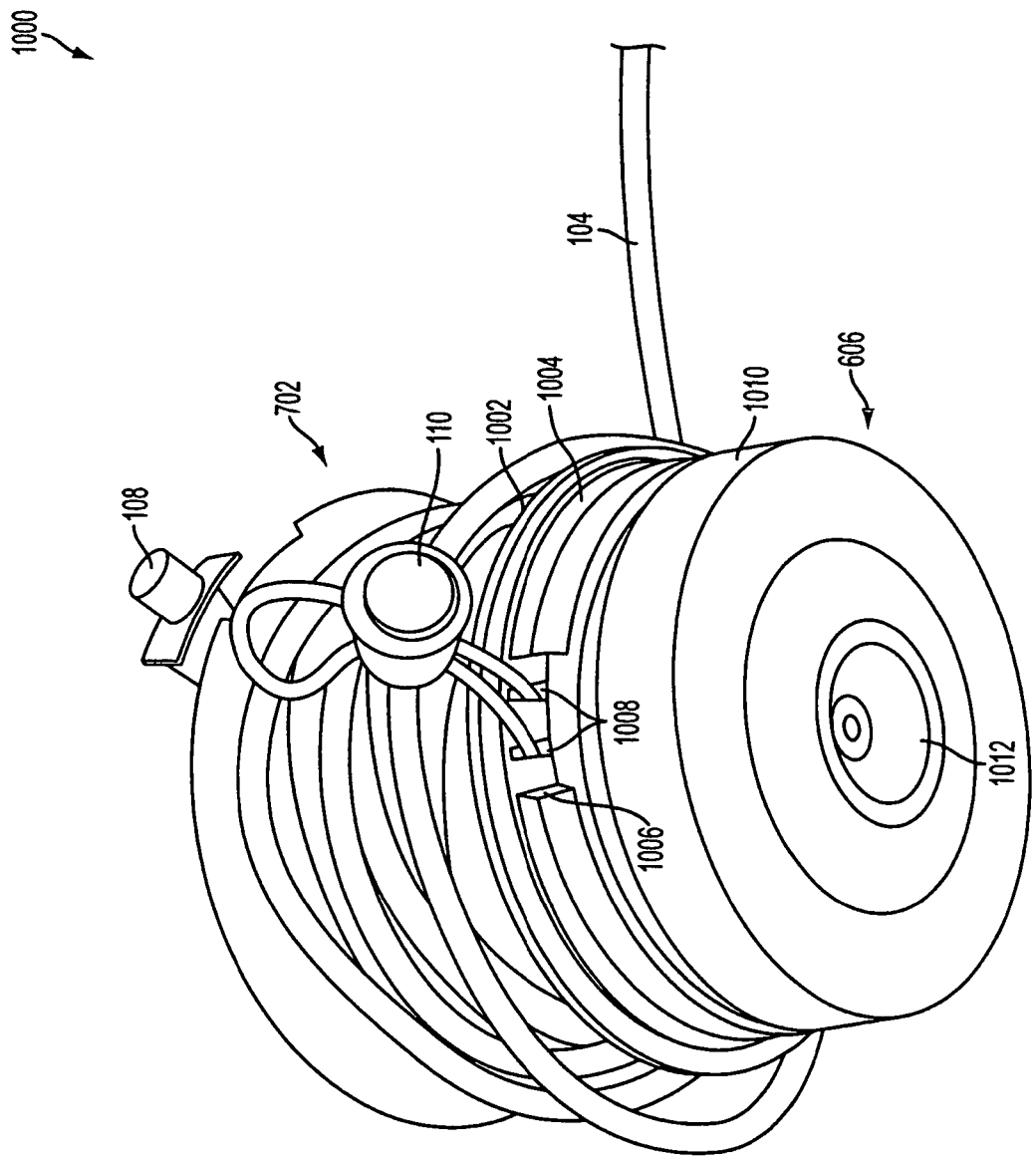
FIG. 10 is a perspective view showing the electric motor inserted in an interior space of the cord receiving member cord winding assembly of FIG. 8 according to an exemplary embodiment of the present invention.

FIG. 10 is a perspective view 1000 showing the electric motor 606 inserted in an interior space of the cord receiving member 604 cord 104 winding assembly 702 of FIG. 8 according to an exemplary embodiment of the present invention. As shown, the outer portion (nearest the opening of the interior space) of the cord receiving member 604 may include an outer lip 1002, and an inner lip 1004, which like lip 816, may be made to ride in rails 608a, 608b, when cord receiving member 604 is rotated. As shown, in an exemplary embodiment, inner lip 1004 may include an opening 1006 providing access to other openings 1008, through which, electrical conductors, such as the wires shown, may extend, from, e.g., on/off toggle switch 110, to electrc motor 606, and power cord 104. As shown, electric motor 606, may include a ring 1010, which may be a rubber ring, in an exemplary embodiment, which may provide a tight fit for stationary electric motor 606 in housing 112. In an exemplary embodiment, incoming vacuum air, pulled from the dustcup 114 when assembled, may be pulled through intake 1012 by a fan of electric motor 606, through an opening in ring 1010.

Figure 11:
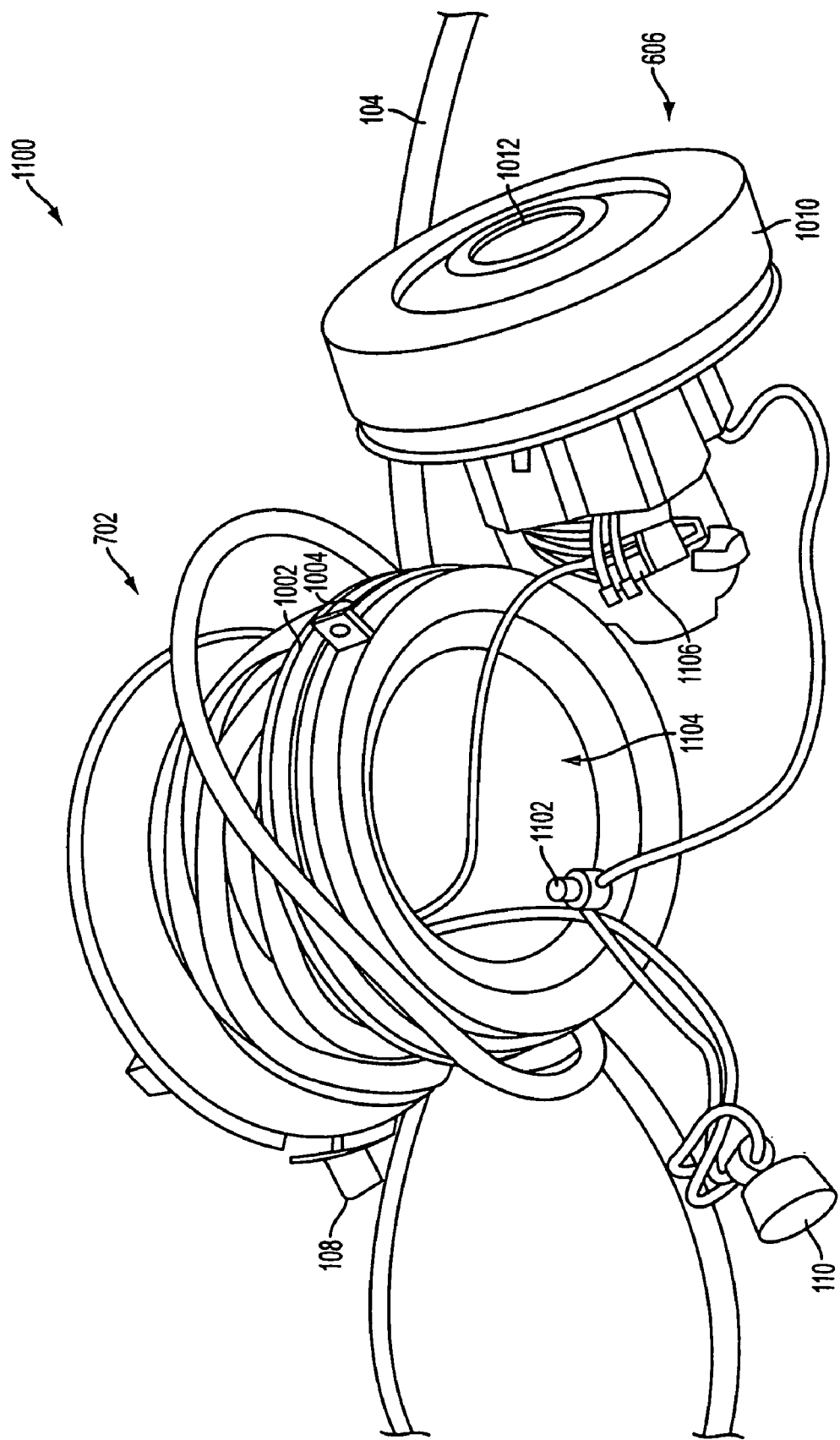
FIG. 11 is a perspective view showing the electric motor removed from the interior space of the cord receiving member cord winding assembly according to an exemplary embodiment of the present invention.

FIG. 11 is a perspective view 1100 showing the electric motor assembly 606 removed from interior space 1104 (shown inserted in FIG. 10) of the cord receiving member 604 cord 104 winding assembly 702 according to an exemplary embodiment of the present invention. The electric motor assembly 606, as shown, may include, in an exemplary embodiment, various commonly included items in a vacuum fan electric motor assembly, including, e.g., but not limited to, a vacuum fan, an electric motor, a thermal cutoff 1106 positioned near the motor to detect overheating of the motor, various electrical conductors (which couple the motor to power cord 104), on/off toggle switch I 10, and any of various other electrical components 1102 (such as, e.g., an on off indicator light, etc.). In an exemplary embodiment, the conductors and other components of the vacuum fan electric motor assembly 606 may be fed into interior space 1104 of the cord receiving member 604, as shown, and portions, such as switch 110, may extend out of the interior space via holes such as 1006, 1008 shown in view 1000 of FIG. 10.

Figure 12:
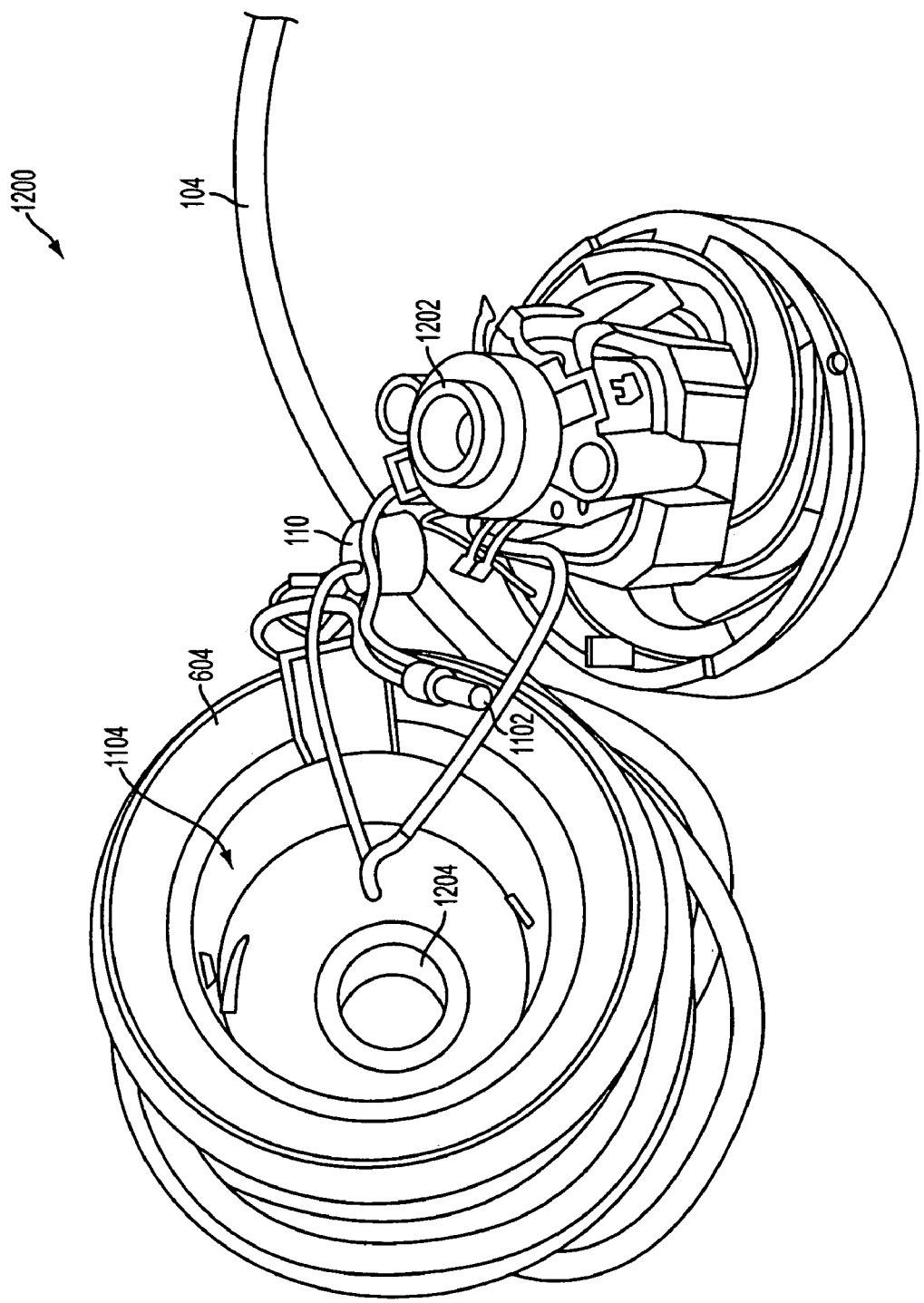
FIG. 12 is another perspective view showing the electric motor assembly removed from the interior space shown in FIG. 11 of the cord receiving member cord winding assembly according to an exemplary embodiment of the present invention.

FIG. 12 is another perspective view 1200 showing the electric motor assembly 606 removed from the interior space 1104 shown in FIG. 11 of the cord receiving member cord 1104 winding assembly according to an exemplary embodiment of the present invention. As shown, the electric motor assembly may have an exhaust end 1202, which may match up to an opening 1204 in the interior space 1204. The exhaust end of the vacuum motor assembly may be in fluid communication to ventilation openings 808 in the cord receiving member and openings 212 in the housing 112. As shown, the electrical conductors may be coupled to the power cord 104 within the interior space of cord receiving member 604.

Figure 13:
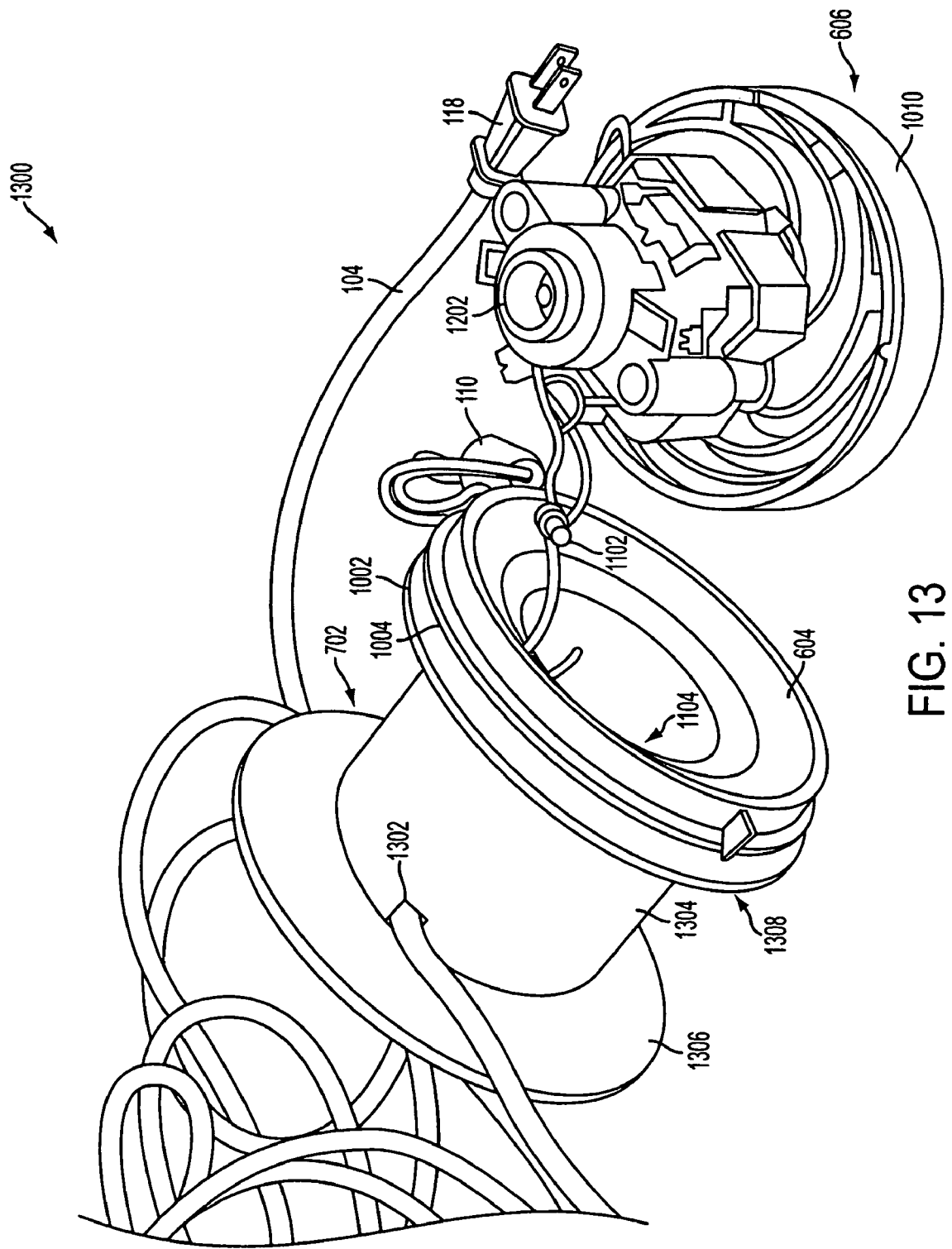
FIG. 13 is another perspective view showing the cord receiving member of FIG. 12 with the electric cord unwound from the cord receiving member, with the electric motor removed from the interior space of the cord receiving member cord winding assembly according to the exemplary embodiment of the present invention.
Figure 14:
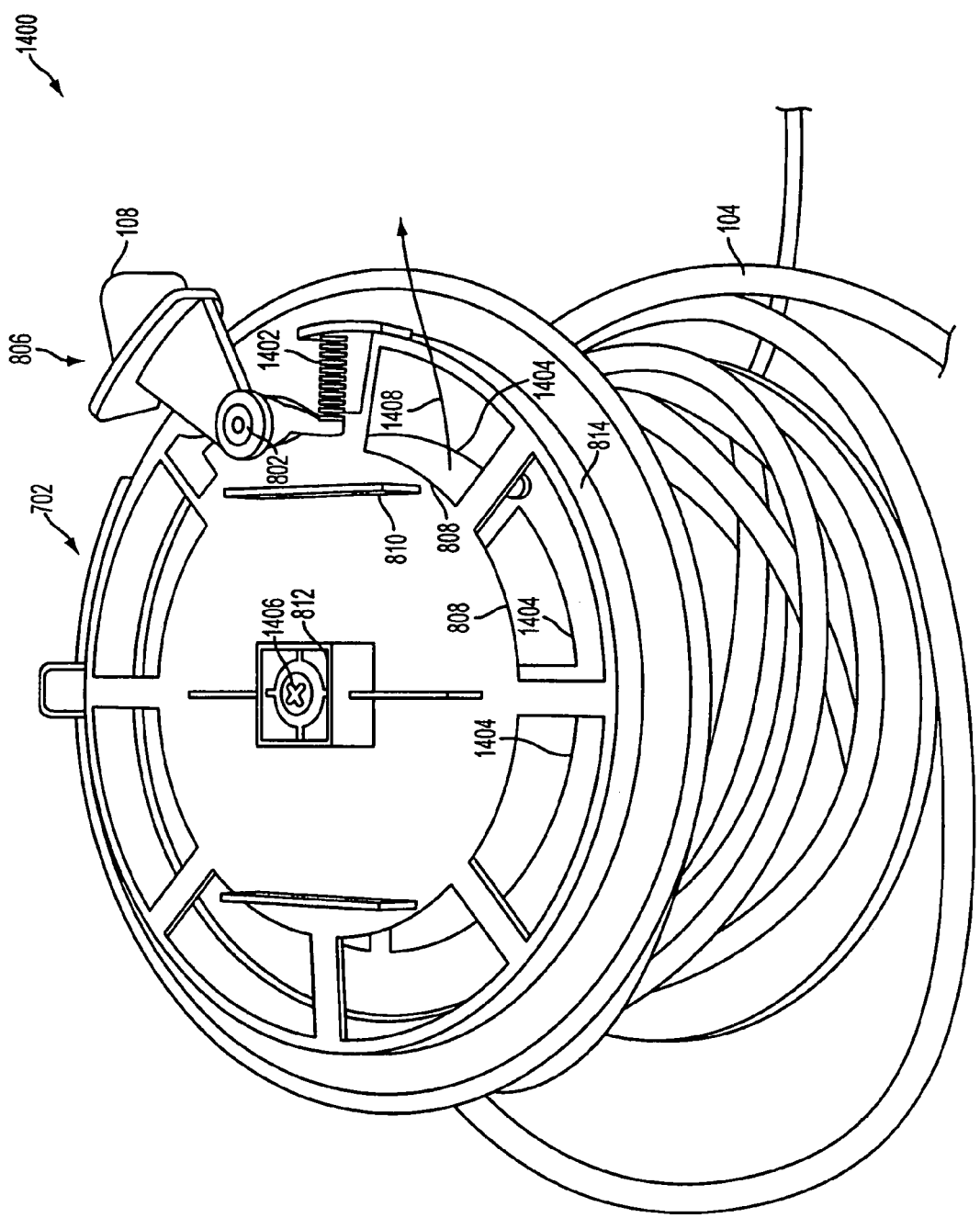
FIG. 14 is a more detailed perspective view of the cord receiving member cord winding assembly of FIG. 9 further illustrating a spring-biased retention member and ventilation openings in the cord receiving member according to an exemplary embodiment of the present invention.
Figure 15:
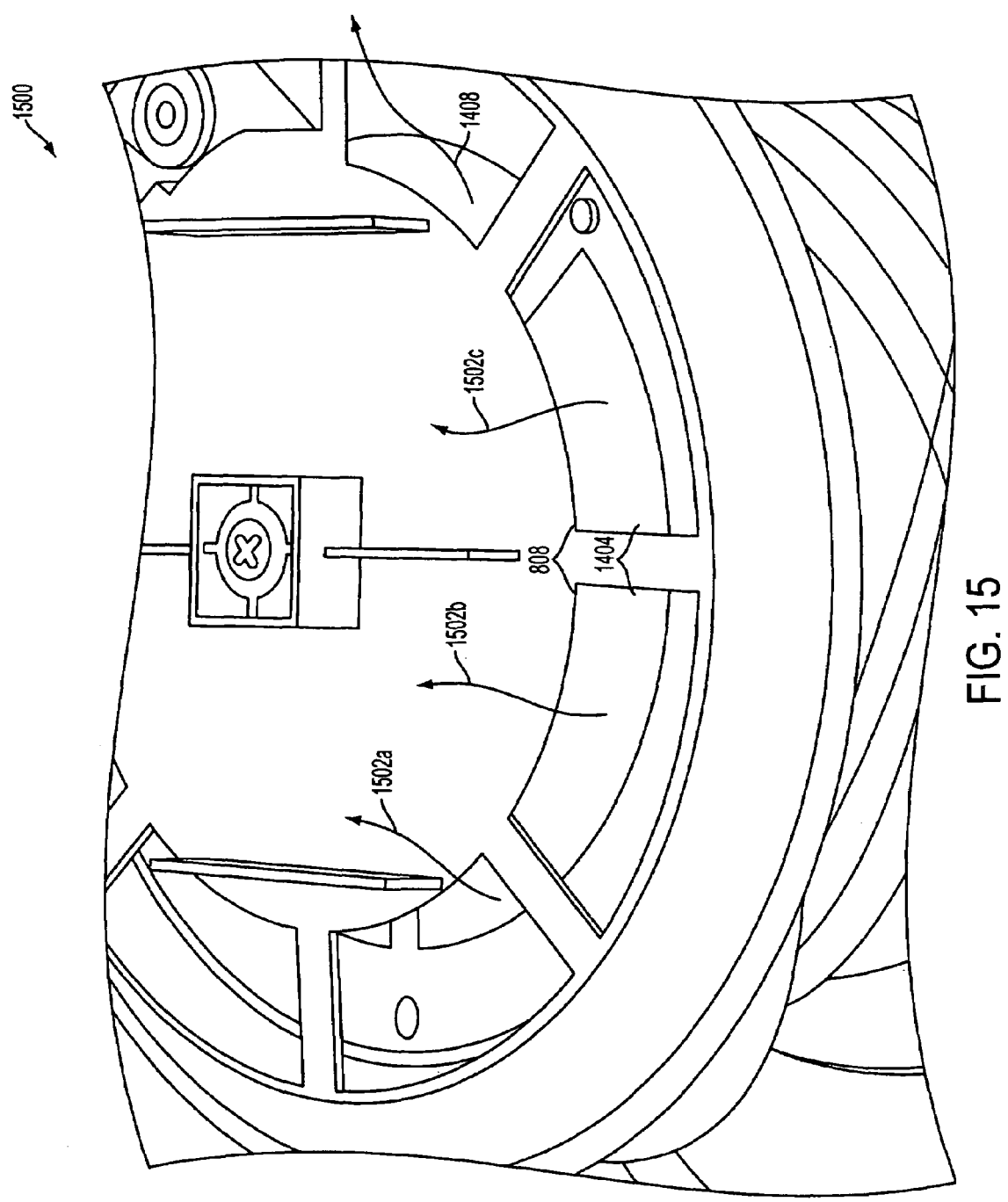
FIG. 15 is a more detailed perspective view of the cord receiving member cord winding assembly further illustrating exhaust flow through the exemplary ventilation openings in the cord receiving member according to an exemplary embodiment of the present invention.

FIG. 13 is another perspective view 1300 showing the cord receiving member 604 of FIG. 12 with the electric cord 104 unwound from the cord receiving member, with the electric motor 606 removed from the interior space 1104 of the cord receiving member 604 cord 104 winding assembly 702 according to the exemplary embodiment of the present invention. As shown, cord receiving member 604 may include outer cylindrical portion 1304 with an opening openings 808, 1404 in the cord receiving member 604 according to an exemplary embodiment of the present invention.

Cord receiving member 604 advantageously requires only a minimal amount of space to contain cord 104, by encircling the motor 606. The retractable cord assembly as described is described for a handheld vacuum cleaner, but could easily be used with other compact electric appliance, and/or handheld electric appliances such as, e.g., but not limited to, a blower, a blow dryer, a drill, a grass cutter, etc. Any device including an electric motor, or needing electric power, could similarly include the cord receiving member cord winding assembly 702 according to the exemplary embodiment.

Figure 16:
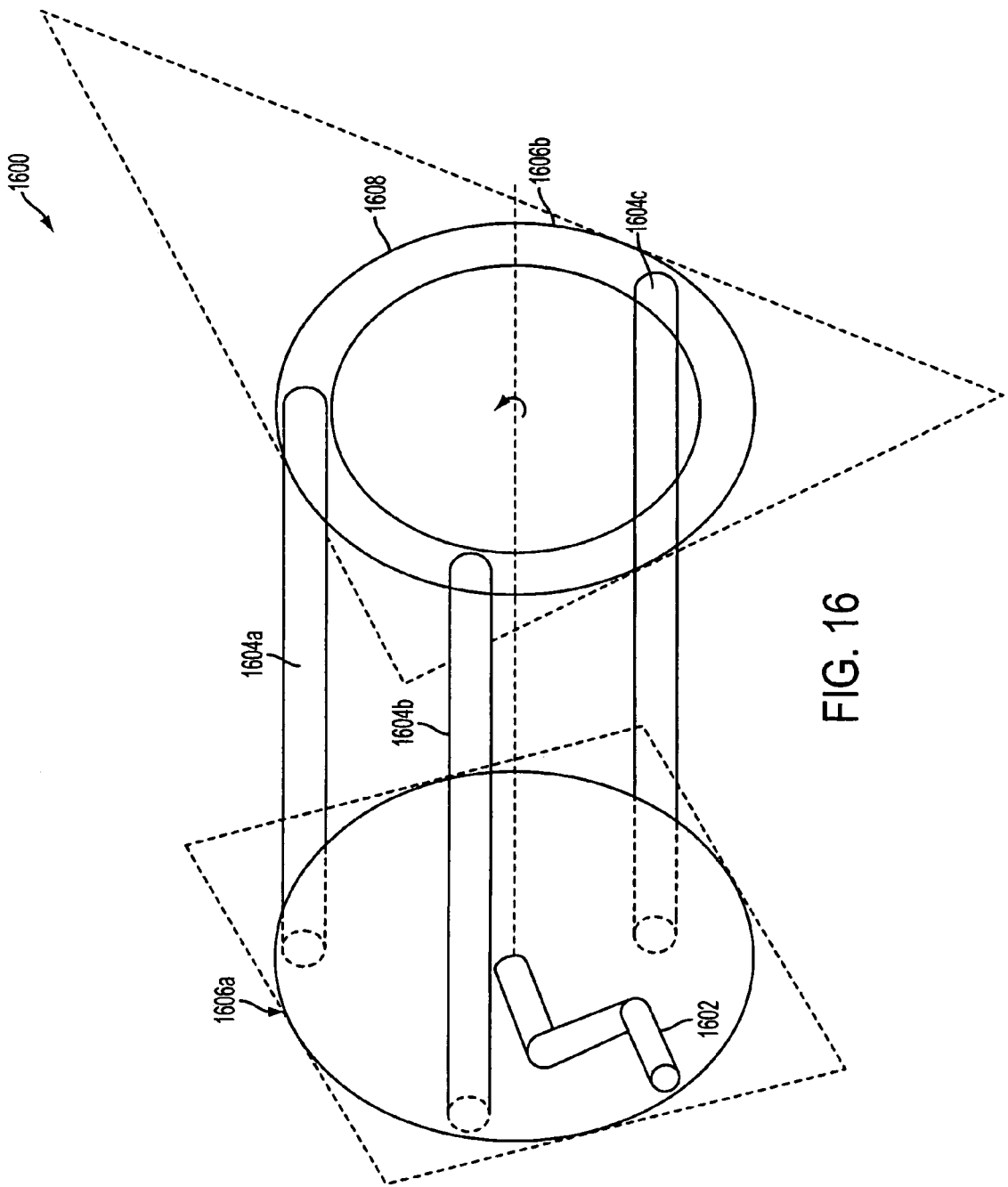
FIG. 16 is an exemplary view of an exemplary embodiment of another cord winding mechanism which may include a manual retracting handle or crank, and a plurality of cross pieces according to another exemplary embodiment of the present invention.

FIG. 16 depicts an exemplary view 1600 of an exemplary embodiment of another cord winding mechanism 604 which may include an exemplary manual handle 1602 adapted to retract the cord according to another exemplary embodiment of the present invention. In an exemplary embodiment, handle 1602 may be collapsible, or removable. Alternatively a spring based automatically rotatable version may be provided. In an exemplary embodiment, a cord receiving member of the mechanism 604 may include, e.g., but not limited to, one or more cross pieces 1604a-c which may be coupled to one or more end pieces 1606a, 1606b. In one exemplary embodiment two (2) or more cross pieces 1604a-c may be used. In one exemplary embodiment three (3) or more cross pieces 1604a-c may be used. In another exemplary embodiment, four (4) or more cross pieces may be used. In one exemplary embodiment, two or more of the cross pieces 1604a-c may be parallel to one another. In one exemplary embodiment, two or more of the end pieces 1604a-c may be parallel to one another. In an exemplary embodiment, one of the end pieces may include an opening 1608. In an exemplary embodiment, the end pieces may be circular. In another exemplary embodiment, the end pieces need not be circular, but may be another shape(e.g., but not limited to, square, triangle, polygon, etc.), so long as a way is provided to allow the device to rotate about the axis. In an exemplary embodiment, the cord receiving member may rotate within a cylindrical shaped cavity within an appliance. In another exemplary embodiment, the cord receiving member may rotate on an which may in some cases include one or more spokes coupled to the axis (not shown) similar to a bicycle tire.

Figure 17:
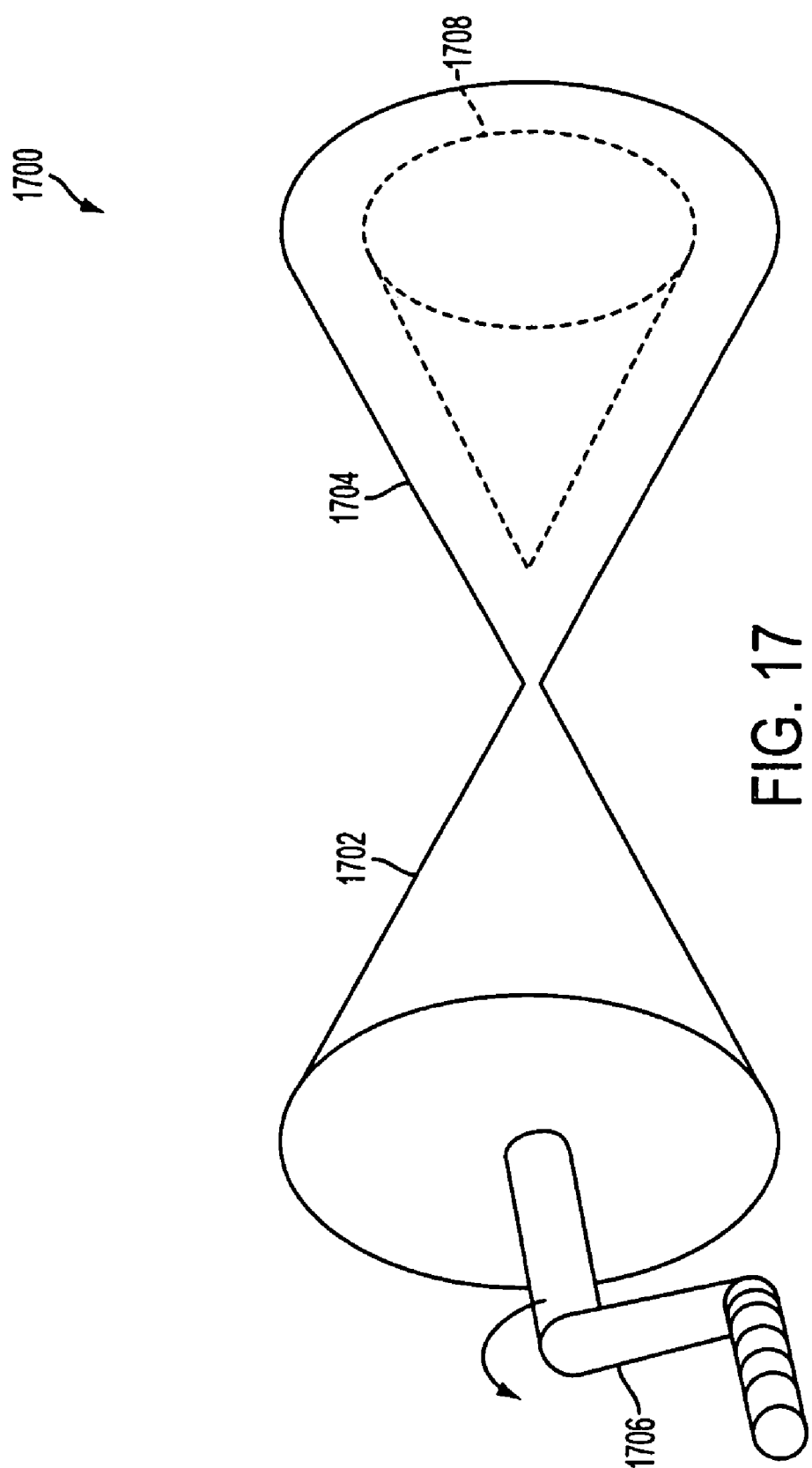
FIG. 17 is an exemplary view of an exemplary embodiment of another cord winding mechanism which may include a handle and a tapering portion according to another exemplary embodiment of the present invention.

FIG. 17 is an exemplary view 1700 of another exemplary embodiment of another cord winding mechanism 604 which may include be manual according to another exemplary embodiment of the present invention. In an exemplary embodiment, a cord receiving member of the mechanism 604 may include, e.g., but not limited to, a tapering portion 1704. In one exemplary embodiment, two or more tapering portions 1702, 1704 may be included such as, e.g., but not limited to, two cones 1702, 1704 substantially aligned point to point along an axis. In one exemplary embodiment one of the tapering portions 1702, 1704 may include a cavity 1708. In one exemplary embodiment, the cavity 1708 may be substantially conical. In an exemplary embodiment, the member may include a handle 1706. The handle 1706 may be collapsible, or removable. Alternatively a spring based automatically rotatable version may be provided. In an exemplary embodiment, the cord receiving member may rotate within a cylindrical shaped cavity within an appliance. In another exemplary embodiment, the cord receiving member may rotate on an which may in some cases include one or more spokes coupled to the axis (not shown) similar to a bicycle tire.

The embodiments illustrated and discussed in this specification are intended only to teach those skilled in the art the best way known to the inventors to make and use the invention. Nothing in this specification should be considered as limiting the scope of the invention. All examples presented are representative and non-limiting. The above-described embodiments of the invention may be modified or varied, without departing from the invention, as appreciated by those skilled in the art in light of the above teachings. It is therefore to be understood that the invention may be practiced otherwise than as specifically described.

What is claimed is:

1. An electrical appliance comprising:
   a handheld portable vacuum device having a removable dirtcup, an electrically powered component, and a cord winding mechanism, the cord winding mechanism comprising:
      a cord receiving member, the cord receiving member being adapted to receive a cord, said cord receiving member defining an interior space inside said cord receiving member and having a first axis;

wherein said cord receiving member receives at least part of the electrically powered component inside the interior space of said cord receiving member to maintain a compact size;

wherein the cord winding mechanism is located inside a housing of the handheld portable vacuum device, and the dirt cup is attached to an exterior side of the housing;

wherein the cord winding mechanism is adapted to rotate about the first axis; and wherein air that has been filtered by the removable dirtcup moves through the interior space of the cord receiving member in a direction substantially parallel to the first axis so as to cool the electrically powered component.

2. The appliance of claim 1, wherein the cord receiving member is configured for receiving at least 50% of the electrically powered component inside the interior space of said cord receiving member.

3. The appliance of claim 2, wherein said cord receiving member is configured for receiving substantially the entire electrically powered component inside the interior space of said cord receiving member.

4. The appliance of claim 1, wherein said cord receiving member further comprises ventilation openings for providing ventilation to the electrically powered component.

5. The appliance of claim 1, wherein the cord winding mechanism further comprises:

a biasing member that transmits a rotational force to said cord receiving member to rotate said cord receiving member about the axis.

6. The appliance of claim 5, wherein the cord winding mechanism further comprises:

a retention member that selectively prevents said cord receiving member from rotating under the rotational force of said biasing member.

7. The appliance of claim 1, wherein the cord winding mechanism further comprises:

a handle coupled to said cord receiving member adapted to manually rotate said cord winding mechanism.

8. The appliance of claim 1, wherein the appliance is capable of being carried and operated with a single hand.

9. The appliance of claim 1, wherein the appliance is a handheld vacuum cleaner.

10. The appliance of claim 1, wherein said removable dirtcup is a substantially parabolic cylinder, and the appliance further comprises an inlet substantially tangential to said removable dirtcup.

11. The appliance of claim 10, wherein the appliance further comprises a filter disposed between said removable dirtcup and said housing and fluidly coupled with ventilation openings in said cord receiving member.

12. The appliance of claim 1, wherein the appliance further comprises a toggling power switch.

13. An electrical appliance having an electrically powered component, a removable dirtcup, and a cord winding mechanism, the mechanism comprising:

cord winding means, the cord winding means being for receiving a cord, said cord winding means defining an interior space inside said cord winding means and having a first axis;

wherein said cord winding means is adapted for receiving at least part of the electrically powered component inside the interior space of said cord winding means to maintain a compact size; and wherein the cord winding mechanism is located inside a housing of the device, and the dirt cup is attached to an exterior side of the housing;

wherein the cord winding mechanism is adapted to rotate about the first axis; and wherein air that has been filtered by the removable dirtcup moves through the interior space of the cord receiving member in a direction substantially parallel to the first axis.

14. The appliance of claim 13, wherein the cord winding mechanism further comprises:

biasing means for transmitting a rotational force to said cord winding means for rotating said cord winding means about the axis.

15. The appliance of claim 14, wherein the cord winding mechanism further comprises:

retention means for selectively preventing said cord winding means from rotating under the rotational force of said biasing means.

* * * * *

UNITED STATES PATENT AND TRADEMARK OFFICE
CERTIFICATE OF CORRECTION

PATENT NO. : 7,490,706 B2  
APPLICATION NO. : 11/070284  
DATED : February 17, 2009  
INVENTOR(S) : Robertson et al.

Page 1 of 1

It is certified that error appears in the above-identified patent and that said Letters Patent is hereby corrected as shown below:

On the Title Page,

Item

[*] Notice: Subject to any disclaimer, the term of this patent is extended or adjusted under 35 USC 154(b) by (160) days Delete the phrase "by 160 days" and insert -- by 203 days --

Signed and Sealed this

Thirteenth Day of October, 2009

David J. Kappos  
*Director of the United States Patent and Trademark Office*